US008593752B2

(12) United States Patent
Kiyonaga et al.

(10) Patent No.: US 8,593,752 B2
(45) Date of Patent: Nov. 26, 2013

(54) PULSE POWER DURING A SHUT DOWN IN A HARD DISK DRIVE

(75) Inventors: Toshihisa Kiyonaga, Kanagawa (JP); Yasuhiro Iihara, Kanagawa (JP); Yoshiroh Amano, Kanagawa (JP); Yoshifumi Kataoka, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 636 days.

(21) Appl. No.: 12/901,227

(22) Filed: Oct. 8, 2010

(65) Prior Publication Data
US 2012/0087032 A1 Apr. 12, 2012

(51) Int. Cl.
*G11B 19/04* (2006.01)

(52) U.S. Cl.
USPC ............................................ 360/68; 360/69

(58) Field of Classification Search
None
See application file for complete search history.

(56) References Cited

U.S. PATENT DOCUMENTS

| 3,624,617 | A | * | 11/1971 | Putterman et al. ............ 711/152 |
| 3,959,778 | A | * | 5/1976 | Brette .............................. 714/22 |
| 4,636,905 | A | * | 1/1987 | Morimoto et al. ............... 360/69 |
| 4,831,469 | A | | 5/1989 | Hanson et al. |
| 5,218,504 | A | * | 6/1993 | Kimura ............................ 360/68 |
| 6,552,933 | B2 | * | 4/2003 | Roohparvar ............. 365/185.18 |
| 6,856,556 | B1 | * | 2/2005 | Hajeck ...................... 365/189.11 |
| 6,903,893 | B2 | | 6/2005 | Perahia |
| 7,116,512 | B1 | | 10/2006 | Rana et al. |
| 7,126,857 | B2 | * | 10/2006 | Hajeck ...................... 365/189.16 |
| 7,227,803 | B2 | * | 6/2007 | Lee et al. ........................ 365/228 |
| 7,478,252 | B2 | * | 1/2009 | Yoon .............................. 713/300 |
| 7,599,241 | B2 | * | 10/2009 | Sprouse et al. ................. 365/228 |
| 7,733,712 | B1 | * | 6/2010 | Walston et al. ........... 365/189.11 |
| 7,882,375 | B2 | * | 2/2011 | Yoon .............................. 713/300 |
| 8,446,795 | B2 | * | 5/2013 | Won .............................. 365/228 |
| 8,471,509 | B2 | * | 6/2013 | Bonvin ..................... 318/400.34 |
| 2009/0204756 | A1 | | 8/2009 | Venturi |
| 2010/0302664 | A1 | * | 12/2010 | Heo et al. ........................ 360/31 |
| 2012/0036328 | A1 | * | 2/2012 | Bay et al. ....................... 711/146 |

FOREIGN PATENT DOCUMENTS

WO WO-2009/025715 2/2009

OTHER PUBLICATIONS

Tech News Daily, "Western Digital's Advanced Format: The 4K Sector Transition Begins", (2009),1-5.
Allpinouts, "Serial ATA (SATA, Serial Advanced Technology Attachment) Connector Pinout", (Jan. 2010),1-12.
Texas Instrument, "Voice-Coil Motor Driver, Spindle-Motor Driver, and Voltage Monitor", *Texas Instruments Incorporated*, (1993),1-31.

* cited by examiner

*Primary Examiner* — Hoa T Nguyen
*Assistant Examiner* — James L Habermehl

(57) ABSTRACT

A HDD including write components configured to operate within an operating voltage range, charging circuitry comprising a charging capacitor. The charging capacitor includes a higher voltage when charged than the operating voltage range. The HDD also includes pulse circuitry configured to pulse power from the charging circuitry to the write components within the operating voltage range during a controlled shut down of the write components such that remaining data-sector bits are written during the controlled shut down.

23 Claims, 7 Drawing Sheets

US 8,593,752 B2

PULSE POWER DURING A SHUT DOWN IN A HARD DISK DRIVE

BACKGROUND

In a hard disk drive (HDD) data is written by a magnetic head on to a rotating magnetic disk. The user data is written on to the magnetic disk in units of individual sectors of 512 bytes. Typically, the HDD operates by being supplied with a power source voltage of 5V from a host device.

In some instances, the power supply voltage to the HDD may become disconnected. If there is a disconnection of the power supply voltage, then there is a limited amount of time to write the user data (or remaining user data). In particular, there may not be enough time to write the user data (or remaining user data) to the individual sector, before there is a hardware reset (due to insufficient voltage). Accordingly, user data can become lost or corrupted.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Figure 1:
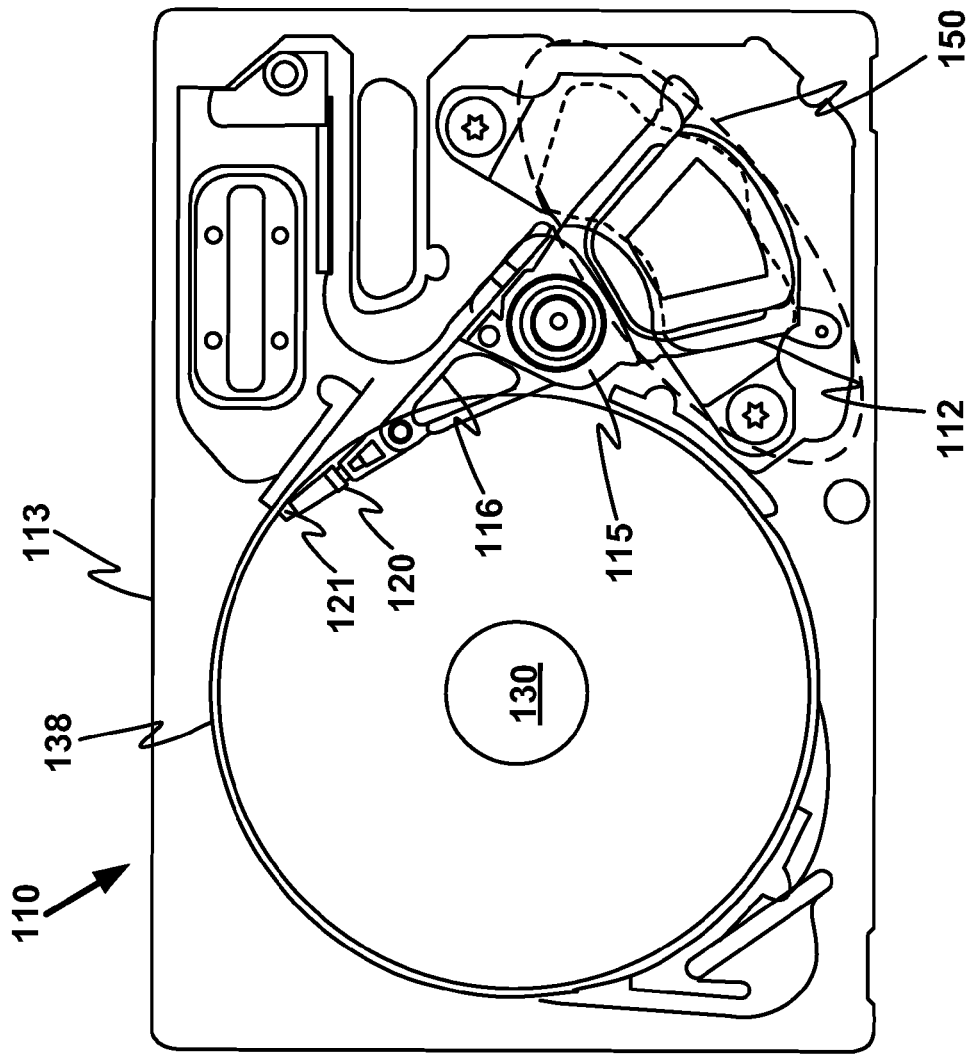
FIG. 1 illustrates an example of a HDD, in accordance with an embodiment of the present invention.

With reference now to FIG. 1, a schematic drawing of one embodiment of an information storage system including a magnetic hard disk file or HDD 110 for a computer system is shown, although only one head and one disk surface combination are shown. What is described herein for one head-disk combination is also applicable to multiple head-disk combinations. In other words, the present technology is independent of the number of head-disk combinations. In another embodiment, HDD 110 is a 2.5 inch miniature magnetic drive. In a further embodiment, HDD 110 is a Serial Advanced Technology Attachment (SATA) hard drive.

In general, HDD 110 has an internal base plate 113 and an internal cover (not shown). In one embodiment, internal housing 113 contains a disk pack having at least one media or magnetic disk 138. The disk pack (as represented by disk 138) defines an axis of rotation and a radial direction relative to the axis in which the disk pack is rotatable.

A spindle motor assembly having a central drive hub 130 operates as the axis and rotates the disk 138 or disks of the disk pack in the radial direction relative to internal base plate 113. An actuator assembly 115 includes one or more actuator arms 116. When a number of actuator arms 116 are present, they are usually represented in the form of a comb that is movably or pivotally mounted to base/housing 113. A controller 150 is also mounted to internal base plate 113 for selectively moving the actuator arms 116 relative to the disk 138. Actuator assembly 115 may be coupled with a connector assembly, such as a flex cable to convey data between arm electronics and a host system, such as a computer, wherein HDD 110 resides.

In one embodiment, each actuator arm 116 has extending from it at least one cantilevered integrated lead suspension (ILS) 120. The ILS 120 may be any form of lead suspension that can be used in a data access storage device. The level of integration containing the slider 121, ILS 120, and read/write head is called the Head Gimbal Assembly (HGA).

The ILS 120 has a spring-like quality, which biases or presses the air-bearing surface of slider 121 against disk 138 to cause slider 121 to fly at a precise distance from disk 138. ILS 120 has a hinge area that provides for the spring-like quality, and a flexing cable-type interconnect that supports read and write traces and electrical connections through the hinge area. A voice coil 112, free to move within a conventional voice coil motor magnet assembly is also mounted to actuator arms 116 opposite the head gimbal assemblies. Movement of the actuator assembly 115 by controller 150 causes the head gimbal assembly to move along radial arcs across tracks on the surface of disk 138.

Disk 138 comprises a plurality of sectors. In various embodiments, each sector is 4 kilobytes (Kbytes). In other words, user data per sector is 4 Kbyte. In contrast, conventional systems comprise 512 bytes per sectors.

System data that is employed by HDD 110 (different from the user data such as servo information) is added between the sectors. The number of sectors of user data increases with the increase in recording density. As a result the amount of system data between the sectors becomes large. It should be understood that the amount of system data between sectors is not directly related to the increase in the recording capacity of HDD 110 as a whole. However, by increasing the amount of data per sector to 4 Kbyte (from 512 byte), the amount of system data is compressed and the resulting improvement in recording density can be effectively utilized as an increase in recording capacity.

Figure 2A:
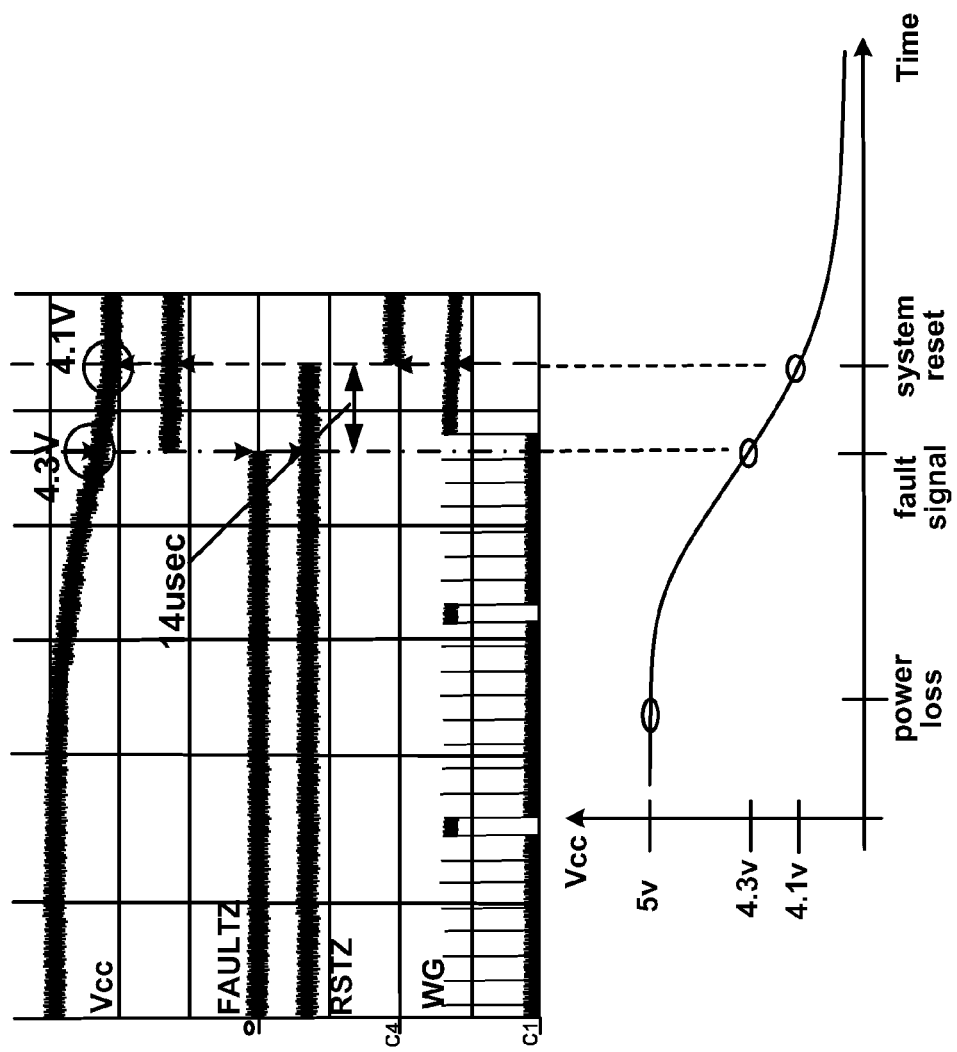
FIGS. 2A-B illustrate conventional technology.
Figure 2B:
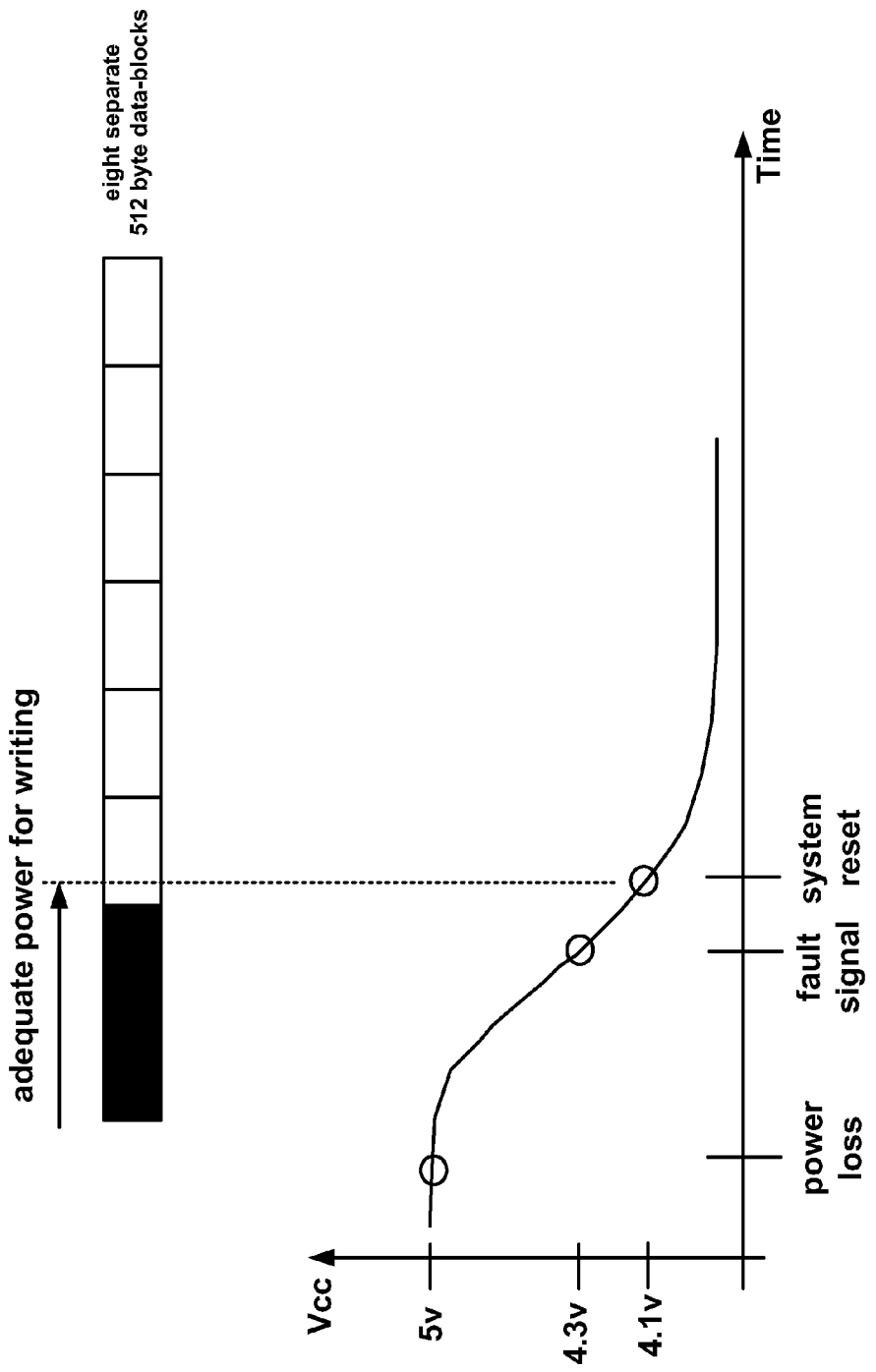

Although the amount of data per sector is 4 Kbyte, the action required when the supplied voltage is disconnected is typically unchanged. For example, as depicted in FIGS. 2A-B, in response to a loss of power, a conventional system comprising 512 byte sectors, may require 14 microseconds for writing of one sector of user data. However, the required 14 microseconds for a conventional system is not sufficient for a system comprising 4 Kbyte sectors.

In FIG. 2A, writing for one data-block is completed after fault signal (FAULTZ) and before the system reset. In FIG. 2B (servo patterns are not depicted for brevity and clarity), there is adequate power to write data to the data blocks until the system reset. Accordingly, any data left to be written at the time of the system reset is not able to be written and is subsequently lost or corrupted.

Figure 3:
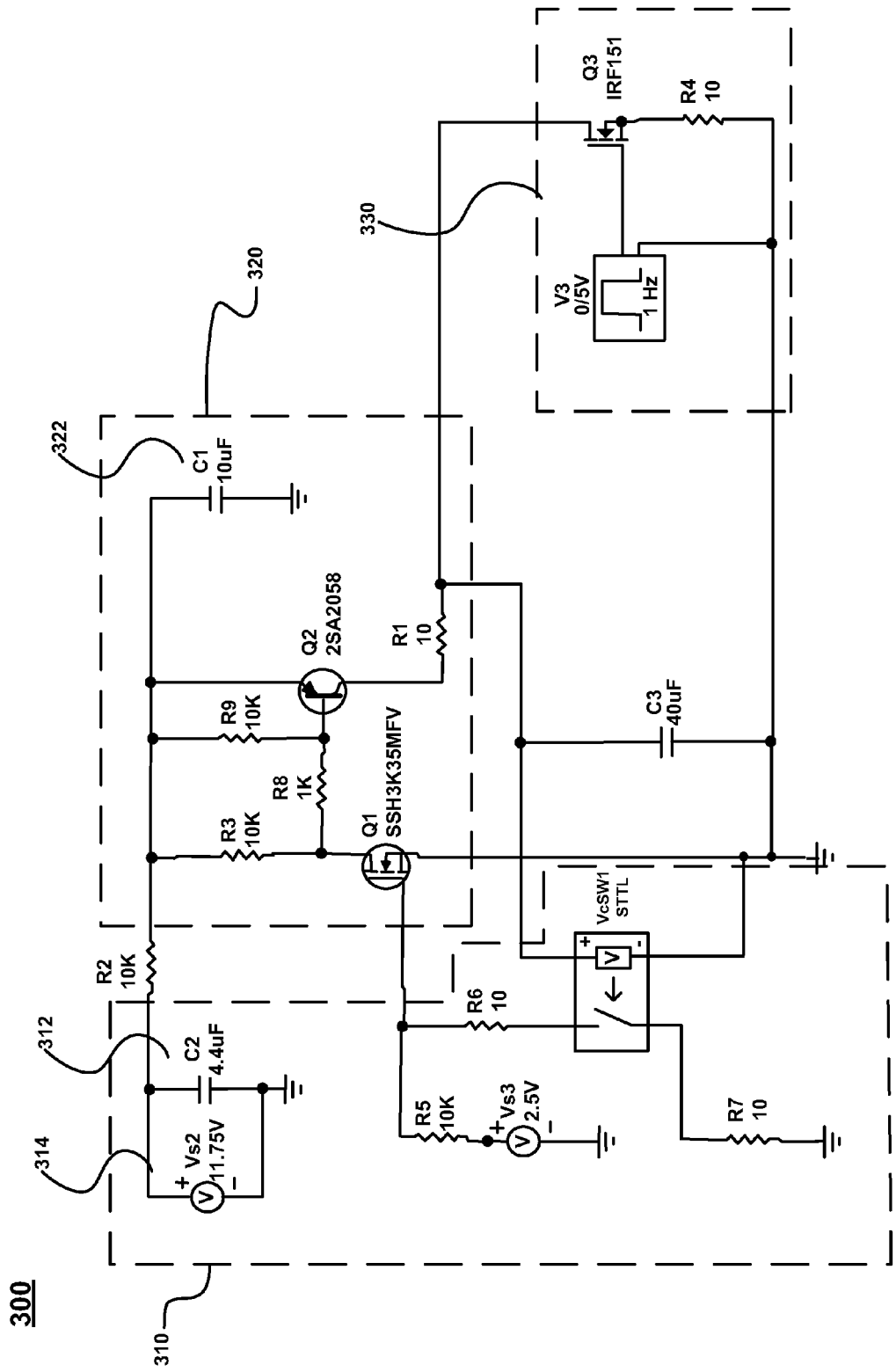
FIG. 3 illustrates circuitry, in accordance with an embodiment of the present invention.

FIG. 3 depicts circuitry 300 of the HDD 110, in accordance to an embodiment of the present invention. Circuitry 300 includes charging circuitry 310 and pulsing circuitry 320. Charging circuitry 310 can also be referred to as combo circuitry or combo driver. Pulsing circuitry 320 can also be referred to as Emergency Power Off (EPO) circuitry. In various embodiments, circuitry 300 includes a system on a chip (SoC) or an integrated chip, for driving HDD 110. In one embodiment, SoC includes an integrated Read Write channel, hard disk drive controller (HDC), and a motor driver.

Charging circuitry 310 is configured to drive both (1) the spindle motor and (2) voice coil motor. Charging circuitry 310 is further configured to constantly or continually monitor the power source voltage (Vcc) 330 and output a fault signal when the voltage drops to first threshold (e.g., 4.3V). Furthermore, when the voltage drops to second threshold (e.g., 4.1V), charging circuitry 310 outputs a hardware reset signal, causing HDD 110 to stop operating.

Moreover, charging circuitry 310 includes a higher voltage, when charged, than the operating voltage range of the write components. For example, the voltage of the charging circuit is 11.25V, while the higher end of the voltage range for the write components is 4.42V. In various embodiments, the voltage level of the charging circuitry is between (and includes) 11V and 12V. In one embodiment, the voltage of charging circuitry 310 is at least two times the top level (e.g., 4.42V) of the operating voltage range of the write components. In another embodiment, the voltage of charging circuitry 310 is at least two times the bottom level (e.g., 4.2V) of the operating voltage range of the write components.

Charging circuitry 310 includes a charging capacitor 312 (e.g., capacitor C2) and charging power source 314 (e.g., Vs2).

In one embodiment, charging capacitor 312, when charged, functions at a higher voltage than an operating voltage range for write components. In another embodiment, charging capacitor 312 is at least 8 microfarad.

In one embodiment, charging power source 312 is a higher voltage line of at least two voltage lines powering HDD 110. For example, the 11.75V Vs2 voltage source is a SATA V12 signal in a 15 pin SATA power connector. In another embodiment, charging power source 312 is a boosted voltage from a combo driver.

In particular, if for any reason power source voltage 330 is disconnected during the writing of user data onto magnetic disk 138, charging circuitry 310 outputs a fault signal (e.g., power loss signal) when a first threshold (e.g., 4.3V) is detected. In response to the fault signal, HDD 110 writes a sector of user data to the magnetic disk. If power source voltage 330 continues to fall and reaches a second threshold (e.g., when the voltage drops to 4.1V), then combo circuitry 310 outputs a system reset signal (e.g. immediate shut down signal). In response to the system reset signal, HDD 110 retracts the actuator to a location remote from magnetic disk 138 and holds it in this position, thereby suspending operation of HDD 110.

Also, in regards to charging circuitry 310 (apart from the 11.75V that is employed as the gate control signal), voltages of 3.3V or 2.5V are created and employed for driving other integrated chips.

Pulse circuitry 320 is configured to deal with emergency power source disconnection. In particular, pulse circuitry 320 is configured to pulse power from charging circuitry 310 to write components within an operating voltage range during a controlled shut down of the write components such that remaining data-sector bits are written during the controlled shut down, which will be described in detail below. Moreover, pulse circuitry 320 pulses power to a servo controller during a controlled shutdown. It should be appreciated that non-necessary electronic components (e.g., servo controller, read head, voice coil motor, and/or spindle motor) can be shut down during the controlled shut down.

Pulse circuitry 320 comprises passive components (e.g., capacitors, transistors and resistors). Pulse circuitry 320 comprises pulse capacitor 322 (e.g., capacitor C1) and two field effect transistors (FET) (e.g., FET Q1 and Q2) acting as a switch for controlling electrical discharge from pulse capacitor 322.

Pulse capacitor 322 is configured to store energy from charging capacitor 312 and maintain an operating voltage range for write electronics. In one embodiment, the operating voltage range is 0.25V or less. For example, an operating voltage range of 4.42V to 4.3V is 0.12V, which is less than 0.25V.

Pulse capacitor 322 charges up with electrical charge during normal operation of HDD 110. For example, a voltage of 11.75V created in charging circuitry 310 is employed for pulse capacitor 322. In one embodiment, capacitance of pulse capacitor 322 is 10 microfarad (μF). In another embodiment, capacitance of pulse capacitor 322 is larger than the capacitance of charging capacitor 312. In a further embodiment, capacitance of pulse capacitor 322 is at least three times the capacitance of charging capacitor 312.

During use, a fault signal activates the switch for discharging pulse capacitor 322. In other words, a fault signal line controls the pulses of power from charging capacitor 312 to pulse capacitor 322. Specifically, when power source voltage 330 drops to a first threshold (e.g., 4.3V), the switch is turned on, allowing the charge that has been accumulated on pulse capacitor 322 to be discharged. When power source voltage 330 recovers (e.g. 4.42V), the switch is turned off, such that pulse capacitor 322 is charged, until the voltage drops to the first threshold again.

When the voltage drops to the first threshold again, the switch is turned on, allowing the charge that has been accumulated on pulse capacitor 322 to be discharged. However, the amount of charge decreases with lapse of time. Accordingly, voltage recovery is not sufficiently performed. As a result, the voltage finally drops to a second threshold (e.g., 4.1V) and a hardware reset signal is output. Then operation of HDD 110 is stopped.

The time required for the voltage to drop from a first threshold to a second threshold can be further extended by this repeated charging and discharging of pulse capacitor 322, as compared to a conventional system, as described above. Therefore, writing of 4 Kbyte of user data onto a 4 Kbyte data block can be secured, so that data loss under emergency conditions can be avoided.

In other words, write splicing is prevented. In general, write splicing occurs when data is being written from a memory cache to magnetic disk 138 and power is suddenly removed. As a result, user data is lost or corrupted. In one embodiment, the time required for data writing is about 80 microseconds. In another embodiment, the time for voltage to drop from 4.3V to 4.1V, in the event of a power source disconnection, is 217 microseconds.

Figure 4:
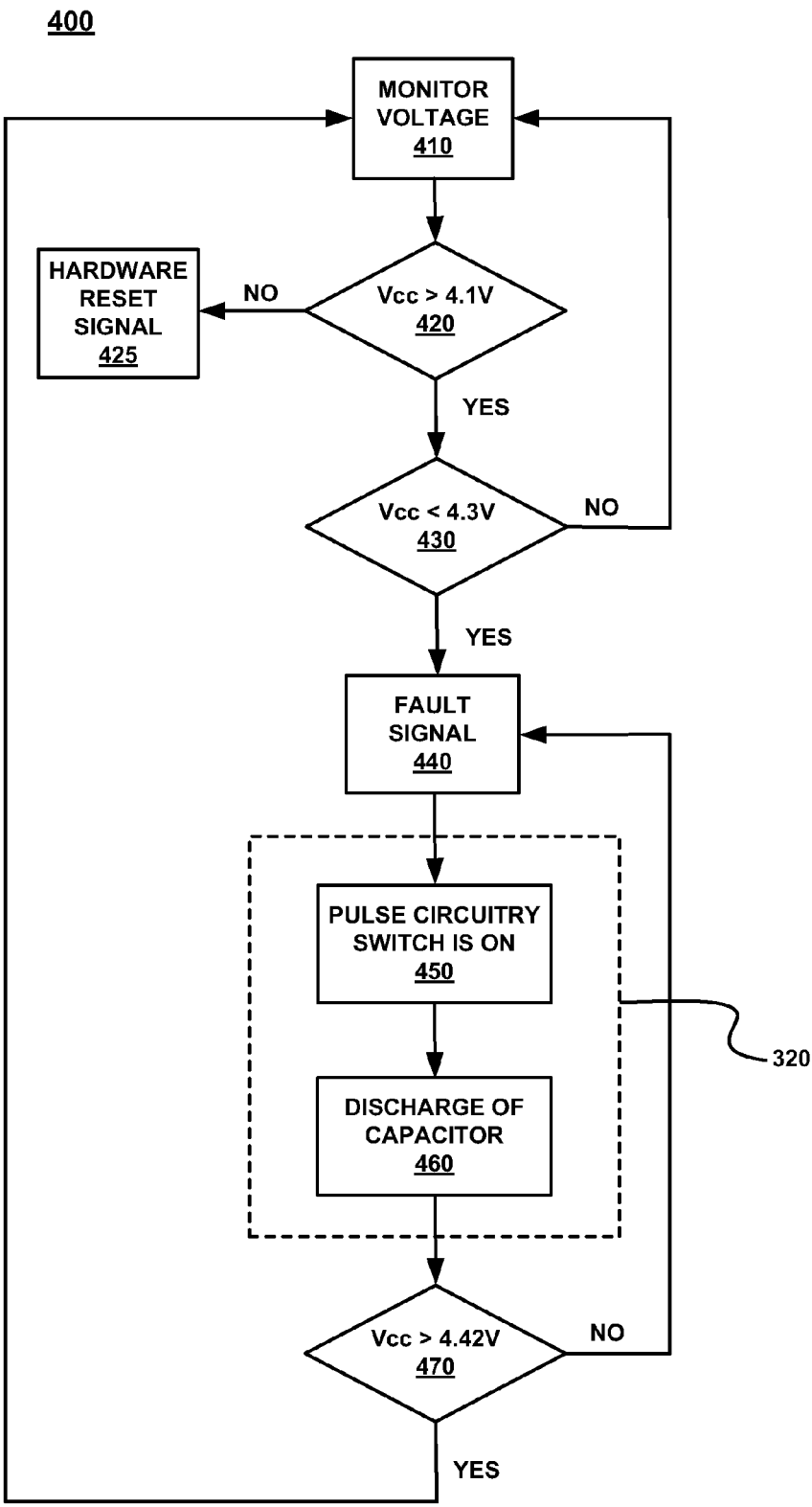
FIG. 4 illustrates an example of an algorithm for providing pulse power during a shut down, in accordance with an embodiment of the present invention.

FIG. 4 depicts an example of an algorithm 400 for providing pulse power during a shut down, in accordance with an embodiment of the present invention.

At 410, the voltage in monitored. For example, an initial 5V drops when the power source is disconnected due to an emergency condition.

At 420, if Vcc is less than 4.1V then, at 425, a hardware reset signal is generated. If Vcc is greater than 4.1V, then, at 430, it is determined if Vcc is less than 4.3V.

At 430, if Vcc is greater than 4.3V, then algorithm 400 restarts at 410. If Vcc is less than 4.3V, then a fault signal is generated at 440. For example, charging circuitry 310 raises the fault signal when the voltage drops to 4.3V.

At 450, the switch of pulse circuitry 320 is turned on. As result, the accumulated charge pulse capacitor 322 is discharged, at 460, to supplement the supplied voltage. When the voltage recovers to 4.42V, the charging circuitry 310 drops the fault signal. When the fault signal drops, the switch of pulse circuitry 320 turns off. As a result, charging capacitor 322 is charged. The voltage Vcc drops again because discharging of charging capacitor 322 has stopped.

At 470, it is determined whether Vcc is greater than 4.42V. If Vcc falls below 4.42V, (e.g., 4.3V), the fault signal is raised once again, at 440, and charging capacitor 322 is discharged again, as described above. In various embodiments, steps 440-460 may occur a plurality of times. However, the charging of charging capacitor 322 may be insufficient after a period of time. If the voltage drops below 4.42V and subsequently to 4.1V charging circuitry 310 outputs a hardware reset signal, at 425, and HDD 110 stops operation.

Figure 5:
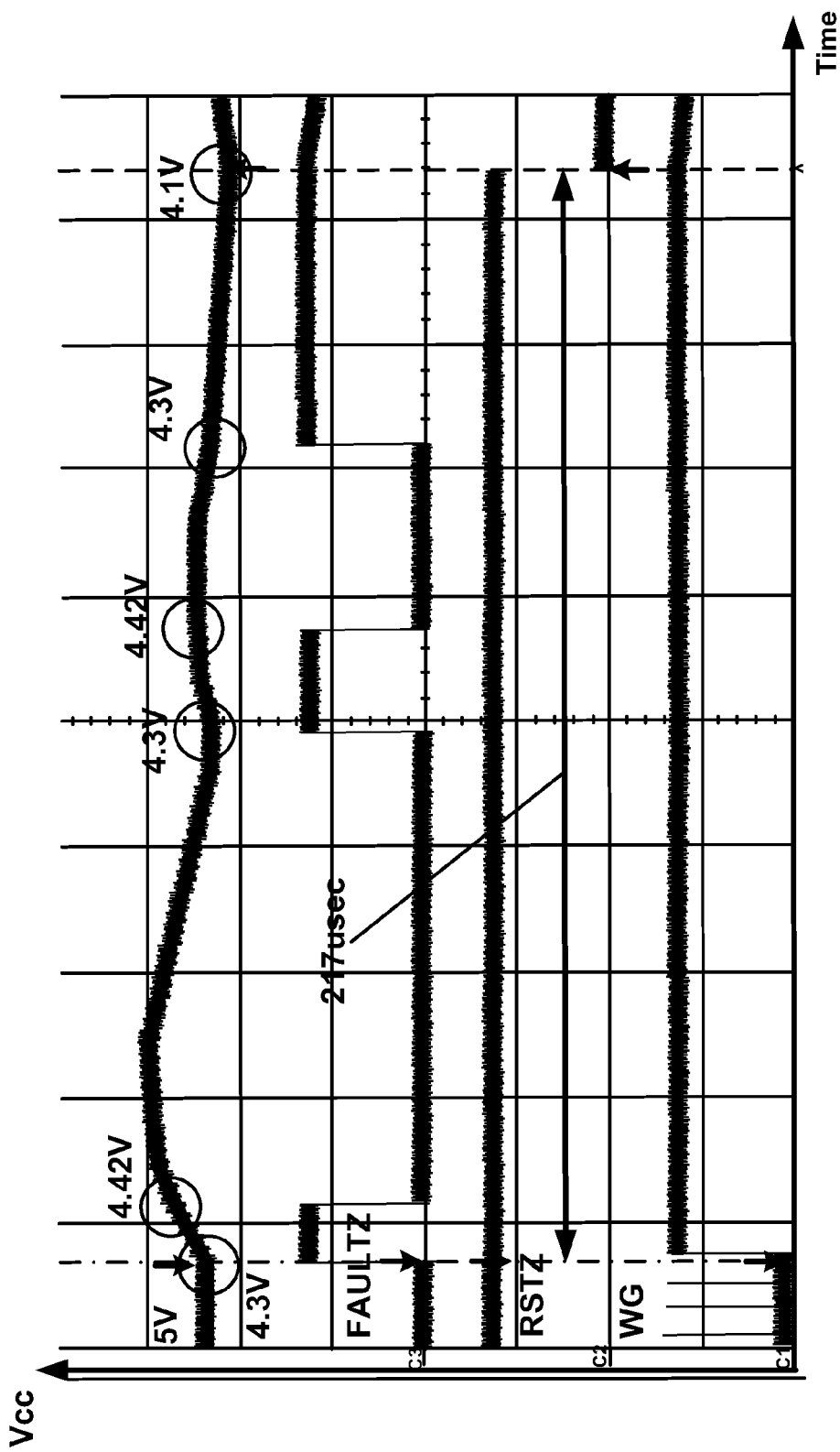
FIG. 5 illustrates signals of an HDD, in accordance with an embodiment of the present invention.

FIG. 5 depicts signals while HDD 110 is operating in response to algorithm 400. For example, when Vcc is less than 4.3V a fault signal (e.g., FAULTZ) is generated and when Vcc is less than 4.1V a reset signal (e.g., RSTZ) is generated, as described above.

In particular, a write gate signal (e.g., WG) via a write gate test pin shows that data bits are being written from the first instance of a fault signal until the reset signal. As a result, the time (e.g., 217 microseconds) from the first instance of a fault signal until the reset signal allows for remaining data sector bits to be written to a 4 Kbyte data block.

Figure 6:
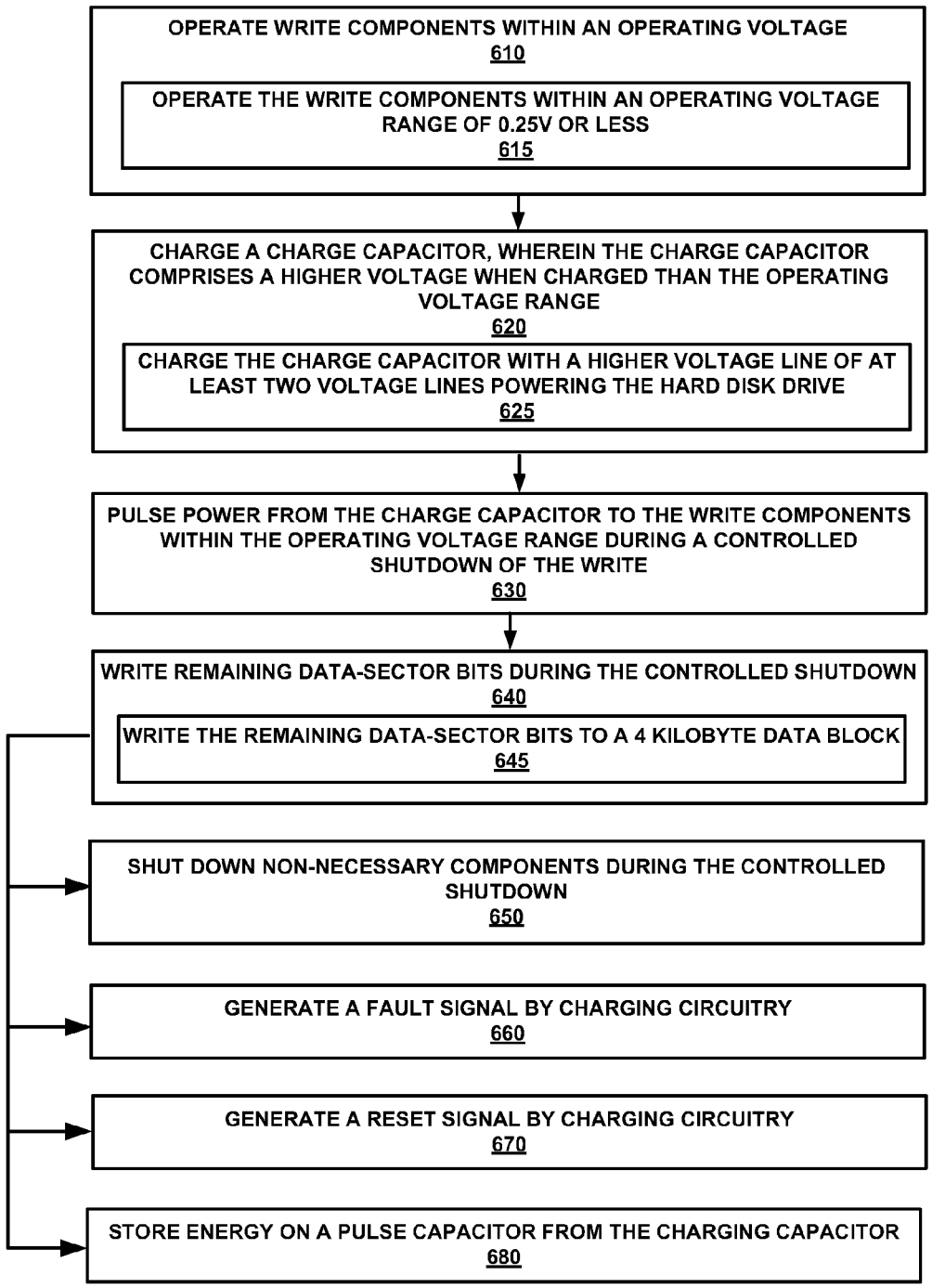
FIG. 6 illustrates an example of a flow chart of a method for providing pulse power during a shut down, in accordance with an embodiment of the present invention.

FIG. 6 depicts a method 600 for pulse power during a shut down in a HDD, in accordance with an embodiment of the present invention. In one embodiment, method 600 is carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In some embodiments, method 600 is performed at least by HDD 110 described in FIG. 1.

At 610, operate write components within an operating voltage. In one embodiment, at 615, the write components are operated within an operating voltage range of 0.25V or less.

At 620, a charge capacitor is charged. The charge capacitor includes a higher voltage when charged than the operating voltage range. In one embodiment, at 625, the charge capacitor is charged with a higher voltage line of at least two voltage lines powering the hard disk drive At 630, power is pulsed from the charge capacitor to the write components within the operating voltage range during a controlled shut down of the write components.

At 640, remaining data-sector bits are written during the controlled shut down. In one embodiment, at 645, the remaining data-sector bits are written to a 4 kilobyte data block.

In one embodiment, at 650, one or more non-necessary electronic components are shut down during the controlled shut down. In another embodiment, at 660, a fault signal is generated by charging circuitry. In a further embodiment, at 670, a reset signal is generated by charging circuitry. In yet another embodiment, at 680, energy is stored on a pulse capacitor from the charging capacitor.

Various embodiments of the present invention are thus described. While the present invention has been described in particular embodiments, it should be appreciated that the present invention should not be construed as limited by such embodiments, but rather construed according to the following claims.

The invention claimed is:

1. A hard disk drive comprising:
    write components configured to operate within an operating voltage range;
    charging circuitry comprising a charging capacitor, wherein said charging capacitor comprises a higher voltage when charged than said operating voltage range; and
    pulse circuitry configured to pulse power from said charging circuitry to said write components within said operating voltage range during a controlled shut down of said write components such that remaining data-sector bits are written during said controlled shut down.

2. The hard disk drive of claim 1, wherein said charging circuitry comprises:
    a power source.

3. The hard disk drive of claim 2, wherein said power source is a higher voltage line of least two voltage lines powering said hard disk drive.

4. The hard disk drive of claim 1, wherein said higher voltage is at least two times a top level of said operating voltage range of said write components.

5. The hard disk drive of claim 1, wherein said pulse circuitry comprises:
    a pulse capacitor configured to store energy from said charging capacitor.

6. The hard disk drive of claim 5, wherein said pulse capacitor is a larger farad rating than said charging capacitor.

7. The hard disk drive of claim 5, wherein said pulse capacitor is at least three times the farad rating than said charging capacitor.

8. The hard disk drive of claim 5 comprising:
    a fault signal line that controls said pulses of power from said charging capacitor to said pulse capacitor.

9. The hard disk drive of claim 1, wherein said operating voltage range is 0.25V or less.

10. The hard disk drive of claim 1, comprising:
    a disk comprising 4 kilobyte data blocks.

11. The hard disk drive of claim 1, wherein one or more non-necessary electronic components are shut down during the controlled shut down.

12. The hard disk drive of claim 1, wherein said pulse circuitry also pulses power to a servo controller during said controlled shut down.

13. A method for pulse power during a shut down in a hard disk drive, said method comprising:
    operating write components within an operating voltage range;
    charging a charge capacitor of a charging circuitry, wherein said charge capacitor comprises a higher voltage when charged than said operating voltage range;
    pulsing power from said charge capacitor to said write components within said operating voltage range during a controlled shut down of said write components; and
    writing remaining data-sector bits during said controlled shut down.

14. The method of claim 13, wherein said charging a charge capacitor comprises:

charging said charge capacitor with a higher voltage line of at least two voltage lines powering said hard disk drive.

15. The method of claim 13, comprising:
shutting down non-necessary components during said controlled shut down.

16. The method of claim 13, wherein said operating write components within an operating voltage range comprises:
operating said write components within an operating voltage range of 0.25V or less.

17. The method of claim 13, comprising:
generating a fault signal by the charging circuitry.

18. The method of claim 17, wherein said fault signal controls said pulses of power from said charge capacitor to a pulse capacitor.

19. The method of claim 13, comprising:
generating a reset signal by the charging circuitry.

20. The method of claim 13, comprising:
storing energy from said charge capacitor on a pulse capacitor.

21. The method of claim 13, wherein said writing remaining data-sector bits during said controlled shut down comprises:
writing said remaining data-sector bits to a 4 kilobyte data block.

22. The method of claim 13, comprising:
shutting down one or more non-necessary electronic components during said controlled shut down.

23. The method of claim 13, comprising:
pulsing power from said charge capacitor to a servo controller during said controlled shut down.

* * * * *